(12) United States Patent
Den Breejen et al.

(10) Patent No.: US 10,444,421 B2
(45) Date of Patent: Oct. 15, 2019

(54) LED-BASED LIGHT FIXTURE

(71) Applicant: Lumileds LLC, San Jose, CA (US)

(72) Inventors: Jeroen Den Breejen, Morgan Hill, CA (US); Yifeng Qiu, San Jose, CA (US)

(73) Assignee: Lumileds LLC, San Jose, CA (US)

( * ) Notice: Subject to any disclaimer, the term of this patent is extended or adjusted under 35 U.S.C. 154(b) by 0 days.

(21) Appl. No.: 15/837,934

(22) Filed: Dec. 11, 2017

(65) Prior Publication Data

US 2018/0164491 A1 Jun. 14, 2018

Related U.S. Application Data

(60) Provisional application No. 62/433,583, filed on Dec. 13, 2016.

(51) Int. Cl.
| | |
|---|---|
| *F21V 8/00* | (2006.01) |
| *H05B 33/08* | (2006.01) |
| *F21Y 103/10* | (2016.01) |
| *F21Y 115/10* | (2016.01) |
| *F21Y 103/33* | (2016.01) |

(52) U.S. Cl.
CPC .......... *G02B 6/0035* (2013.01); *G02B 6/009* (2013.01); *G02B 6/0061* (2013.01); *G02B 6/0091* (2013.01); *H05B 33/0815* (2013.01); *F21Y 2103/10* (2016.08); *F21Y 2103/33* (2016.08); *F21Y 2115/10* (2016.08); *G02B 6/0036* (2013.01); *G02B 6/0043* (2013.01); *G02B 6/0068* (2013.01)

(58) Field of Classification Search
CPC ............................ G02B 6/0035; G02B 6/0061

USPC .......................................... 362/606; 315/301
See application file for complete search history.

(56) References Cited

U.S. PATENT DOCUMENTS

| | | |
|---|---|---|
| 8,493,000 B2 | 7/2013 | Jungwirth |
| 8,573,823 B2 | 11/2013 | Dau et al. |
| 9,151,461 B1 | 10/2015 | Kuo et al. |
| 9,414,454 B2 | 8/2016 | Brandes et al. |
| 2012/0069595 A1 | 3/2012 | Catalano |
| 2013/0258709 A1 | 10/2013 | Thompson et al. |
| 2013/0278163 A1* | 10/2013 | Rodriguez ......... H05B 33/0842 315/201 |
| 2014/0056026 A1 | 2/2014 | Boomgaarden et al. |

(Continued)

FOREIGN PATENT DOCUMENTS

| | | |
|---|---|---|
| AU | 2012101625 | 11/2012 |
| EP | 2447747 | 5/2012 |

(Continued)

*Primary Examiner* — Allyson N Trail
(74) *Attorney, Agent, or Firm* — Schwegman Lundberg & Woessner, P.A.

(57) ABSTRACT

An illumination system is disclosed that is arranged to compensate for variations in brightness between different LEDs in the system. The system may include an array of LEDs coupled to a light guide that is provided with a plurality of light extraction patterns. Each light extraction pattern may include a plurality of light extraction features. The light extraction patterns may differ from one another in the density of the features. Light extraction patterns having a greater density may be combined with LEDs in the array that are less bright, whereas light extraction patterns having a lower feature density may be combined with LEDs in the array that are brighter.

20 Claims, 11 Drawing Sheets

(56) References Cited

U.S. PATENT DOCUMENTS

| | | | |
|---|---|---|---|
| 2015/0282260 A1* | 10/2015 | Hussell | H05B 33/0806 |
| | | | 315/51 |
| 2016/0143096 A1* | 5/2016 | Lin | H05B 37/02 |
| | | | 315/121 |
| 2016/0165680 A1* | 6/2016 | Johnson | H05B 33/083 |
| | | | 315/51 |
| 2016/0374170 A1 | 12/2016 | Lee | |

FOREIGN PATENT DOCUMENTS

| | | |
|---|---|---|
| WO | 2005/001892 | 1/2005 |
| WO | 2016/020402 | 2/2016 |

* cited by examiner

LED-BASED LIGHT FIXTURE

CROSS REFERENCE TO RELATED APPLICATIONS

This application claims the benefit of U.S. Provisional Application No. 62/433,583 filed on Dec. 13, 2016, the contents of which are hereby incorporated by reference herein as if fully set forth.

FIELD OF INVENTION

The present disclosure relates to light emitting devices in general, and more particularly, to an LED-based light fixture.

BACKGROUND

Light emitting diodes ("LEDs") can be used as light sources in various applications. LEDs are more energy-efficient than traditional light sources, providing much higher energy conversion efficiency than incandescent lamps and fluorescent light, for example. Furthermore, LEDs radiate less heat into illuminated regions and afford a greater breadth of control over brightness, emission color and spectrum than traditional light sources. These characteristics make LEDs an excellent choice for various lighting applications. Accordingly, the need exists for improved light fixture designs that are adapted to use LEDs as their primary light source.

SUMMARY

The present disclosure addresses this need. According to aspects of the disclosure, an illumination system is provided, comprising: a driver circuit including a plurality of tap points, the driver circuit being configured to produce a cyclical waveform and switch the tap points on and off in sequence during each cycle of the waveform; a light guide having a light emitting surface, the light emitting surface having a plurality of portions, each portion having a different light extraction pattern formed thereon, each light extraction pattern including a different plurality of light extraction features, and each light extraction pattern having a different light extraction feature density; and a plurality of light emitting diodes (LEDs), each LED being electrically coupled to a different respective one of the plurality of tap points and coupled to a different respective one of the plurality of portions of the light guide, such that a length of a period for which the LED is powered on during each cycle of the waveform is inversely proportional to the light extraction feature density of the respective portion's light extraction pattern.

BRIEF DESCRIPTION OF THE DRAWINGS

The drawings described below are for illustration purposes only. The drawings are not intended to limit the scope of the present disclosure. Like reference characters shown in the figures designate the same parts in the various embodiments.

DETAILED DESCRIPTION

Figure 1A:
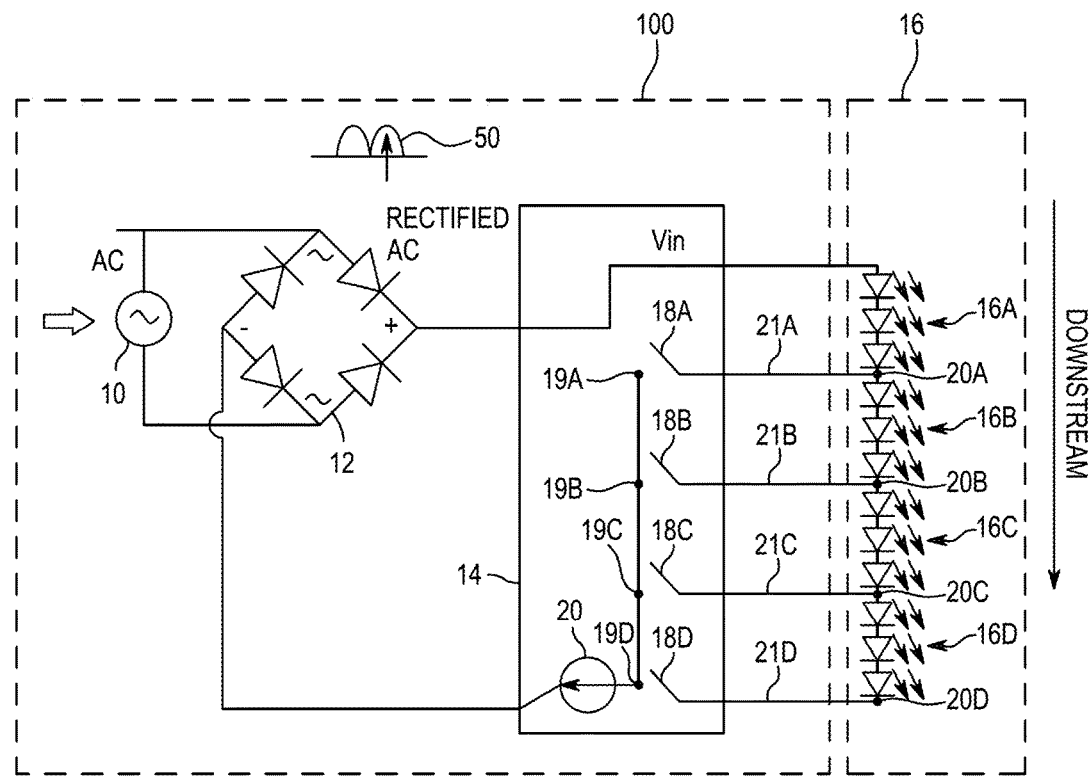
FIG. 1A is a diagram of an example of a driver circuit, according to the prior art.

The present disclosure provides various light fixture designs that are adapted to use LEDs as their primary source. These designs include various improvements for balancing out variations in brightness between the LEDs in a light fixture that uses a tapped linear driver to power the LEDs. The improvements may be needed because when a tapped linear driver is used to power the LEDs in a light fixture, the light output of the light fixture may have a non-uniform brightness for reasons that are inherent in the operation of tapped linear drivers.

According to aspects of the disclosure, an improved light fixture is disclosed that is arranged to compensate for variations in brightness between different LEDs in the light fixture, which may result when a tapped linear driver is used. The light fixture may include an array of LEDs coupled to a light guide that is provided with a plurality of light extraction patterns. Each light extraction pattern may include a plurality of light extraction features. The light extraction patterns may differ from one another in the density of the features. Light extraction patterns having a greater density may be combined with LEDs in the array that are less bright, whereas light extraction patterns having a lower feature density may be combined with LEDs in the array that are brighter. As a result, the higher brightness of some LEDs in the array may be balanced out by the lower density of the LEDs' respective light extraction pattern, resulting in a more uniform brightness across the light fixture.

As further discussed below, the balancing out of the variations in brightness is possible because the density of light extraction features in the light extraction patterns determines the rate at which light is extracted by them. Thus, combining brighter LEDs with sparser light extraction patterns, may cause less light from the brighter LEDs to be extracted out of the light fixture. Conversely, combining dimmer LEDs with denser light extraction patterns may cause a larger amount of the light produced the dimmer LEDs to be extracted out of the light fixture. Accordingly, the use of light extraction patterns of variable light extraction feature density may effectively cause the LEDs in the light fixture to appear as having substantially the same brightness when the light fixture is viewed from a distance.

According to aspects of the disclosure, an improved light fixture is disclosed that is arranged to compensate for variations in brightness between different LEDs in the light fixture. The LEDs in the light fixture may be coupled to a light guide and arranged in groups that may have the same or similar average brightness. Each group may include one LED having a higher brightness, and another LED having a lower brightness. The LEDs in each group may be co-located and coupled to the same portion of the light guide. As a result, the light outputs of the LEDs in any given group may be mixed with one another, making the differences in brightness between the LEDs in the group less perceptible from a distance.

According to aspects of the disclosure, an illumination system is disclosed, comprising: a light guide; a driver circuit including a plurality of tap points, the driver circuit being configured to produce a cyclical waveform and switch the tap points on and off in sequence during each cycle of the waveform; and a plurality of first light emitting diode (LED) groups that are coupled to the light guide and have a same average on-time, each of the first LED groups including a respective first LED and a respective second LED that are disposed adjacently to one another and coupled to different tap points of the driver circuit, the first LED in any given first LED group being coupled in series with one or more other first LEDs that are part of other first LED groups, and the second LED in any given first LED group being coupled in series with one or more other second LEDs that are part of other first LED groups.

According to aspects of the disclosure, an illumination system is disclosed, comprising: a light guide having a plurality of portions; a driver circuit including a plurality of tap points, the driver circuit being configured to produce a cyclical waveform and switch the tap points on and off in sequence during each cycle of the waveform; a plurality of first LEDs coupled in series, each first LED being coupled to a different tap point of the light guide, and each first LED being coupled to a different portion of the light guide, such that each portion of the light guide is coupled to a different respective first LED; a plurality of second LEDs coupled in series, each second LED being coupled to a different tap point of the light guide, and each second LED being coupled to a different portion of the light guide, such that each portion of the light guide is also coupled to a different respective second LED, and an average on-time of all LEDs that are coupled to any given portion of the light guide is substantially the same.

Examples of different lighting systems will be described more fully hereinafter with reference to the accompanying drawings. These examples are not mutually exclusive, and features found in one example can be combined with features found in one or more other examples to achieve additional implementations. Accordingly, it will be understood that the examples shown in the accompanying drawings are provided for illustrative purposes only and they are not intended to limit the disclosure in any way. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element such as a layer, region or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. It will be understood that these terms are intended to encompass different orientations of the element in addition to any orientation depicted in the figures.

Relative terms such as "below" or "above" or "upper" or "lower" or "horizontal" or "vertical" may be used herein to describe a relationship of one element, layer or region to another element, layer or region as illustrated in the figures. It will be understood that these terms are intended to encompass different orientations of the device in addition to the orientation depicted in the figures.

FIG. 1A is a diagram of a driver circuit 100 in which a linear driver 14 is used to drive a serial array of LEDs 16A-D. As shown, an AC mains voltage 10, such as 120 volts (V) root mean square (RMS) at 60 Hz, may be rectified by a full bridge rectifier 12 to produce a cyclical waveform 50. The cyclical waveform 50 may then be fed to the input of the linear driver 14. The linear driver 14 may include tap points 19A, 19B, 19C, and 19D. The LED array 16 may include groups 16A, 16B, 16C, and 16D. Each one of the groups 16A-D may include any number of LEDs (e.g., 6 LEDs). The LEDs in group 16A may be connected to the linear driver 14 via the tap point 19A. The LEDs in group 16B may be connected to the linear driver 14 via the tap point 19B. The LEDs in group 16C may be connected to the linear driver 14 via the tap point 19C. And the LEDs in group 16D may be connected to the linear driver 14 via the tap point 19D.

The LEDs in the LED array 16 may be coupled to the driver circuit 100, in accordance with the topology shown in FIG. 1A. As illustrated, the LEDs in the LED array 16 may be arranged in groups 16A-D. The LEDs in each of groups 16A-D may be connected in series to one another. Furthermore, the groups may be connected in series, as well. For example, group 16A and group 16B may both be coupled to a node 20A which is located downstream from group 16A and upstream from group 16B. Group 16B and group 16C may both be coupled to a node 20B which is located downstream from group 16B and upstream from group 16C. Group 16C and group 16D may both be coupled to a node 20C which is located downstream from group 16C and upstream from group 16D. Group 16D may also be coupled to a node 20D, which is located downstream from group 16D.

Moreover, according to the topology shown in FIG. 1A, each of nodes 20A-20B may be coupled to a different one of the tap points 19A-D. More particularly, node 20A may be coupled to the tap point 19A via an electrical path 21A. Node 20B may be coupled to the tap point 19B via an electrical path 21B. Node 20C may be coupled to the tap point 19C via an electrical path 21C. And node 20D may be coupled to the tap point 19D via an electrical path 21D. By way of example, in some implementations, the paths 21A-D may be completely disjoint. Additionally or alternatively, in some implementations, the paths 21A-D may be parallel to one another.

Each of the tap points 19A-D may be coupled to a current source 20. Each of the tap points may be also coupled to a different one of switches 18A-D. Each of the tap points 18A-D may be switched on and off using the tap point's respective switch. For example, the tap point 19A may be coupled to a switch 18A. When the switch 18A is closed, the tap point 19A may be said to be switched on, and when the switch 18A is opened, the tap point 19A may be said to be switched off. As another example, the tap point 19B may be coupled to a switch 18B. When the switch 18B is closed, the tap point 19B may be said to be switched on, and when the switch 18B is opened, the tap point 19B may be said to be switched off. As yet another example, the tap point 19C may be coupled to a switch 18C. When the switch 18C is closed, the tap point 19C may be said to be switched on, and when the switch 18C is opened, the tap point 19C may be said to be switched off. As yet another example, the tap point 19D may be coupled to a switch 18D. When the switch 18D is closed, the tap point 19D may be said to be switched on, and when the switch 18D is opened, the tap point 19D may be said to be switched off.

Figure 1B:
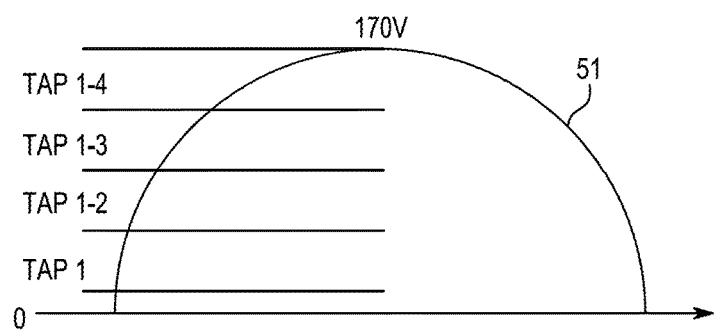
FIG. 1B is a graph illustrating the cycle of a waveform produced by the driver circuit of FIG. 1A, according to the prior art.

According to aspects of the disclosure, the driver circuit 100 may be configured to switch the tap points 19A-B on and off in sequence during each cycle of the waveform 50. More particularly, the driver circuit 100 may include control circuitry (not shown) that is arranged to open and close the switches 18A-D in sequence during each cycle 51 of the waveform 50 produced by the rectifier 12. A graph of the cycle 51 of the waveform 50 is shown in FIG. 1B. As illustrated, in each cycle, the voltage output by the rectifier 12 varies between 0V and 170V. At the start of the cycle, when the voltage is between 0V and 34V, all switches 18A-D may be open. Near the start of a cycle, when the voltage is fairly low (between 34V-68V), the switch 18A may be closed (by using a comparator (not shown) that is part of the circuit 100) to only couple the LEDs in group 16A to the current source 20. When the voltage rises above 68V, the switch 18B may be closed and the switch 18A may be opened to couple the first and second groups of LEDs 16A and 16B to the current source 20. When the voltage rises above 102V, the switch 18C may be closed and the switch 18B may be opened to couple three groups of LEDs 16A-16C to the current source 20. And when the voltage rises above 136V, the switch 18D may be closed and the switch 18C may be opened to couple all four groups of LEDs 16A-16D to the current source 20. The sequence repeats in the reverse direction as the voltage goes back to zero.

Figure 1C:
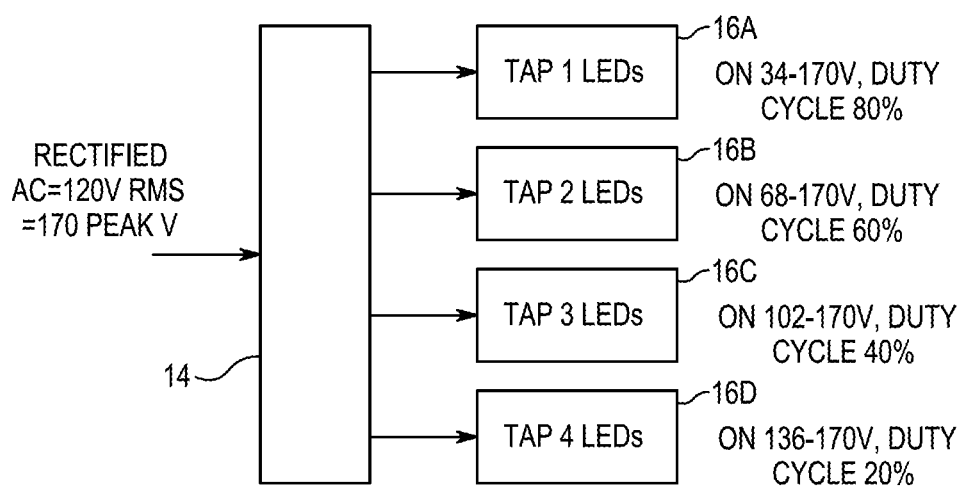
FIG. 1C is a schematic diagram illustrating the operation of the circuit of FIG. 1A, according to the prior art.

As a result of the switches 18A-D being closed in a sequence, each of the LED groups 16A-D may have a different on-time. The term "on-time," as used throughout the present disclosure, shall refer to the duration for which an LED or a group of LEDs is energized (and/or supplied with power) during each cycle of the waveform 50. In the present example, the on-time of each of the LED groups 16A-D is measured as a percentage of the total duration of each cycle of the waveform 50. As illustrated in FIG. 1C, the LEDs in group 16A may have an on-time of 80%. The LEDs in group 16B may have an on-time of 60%. The LEDs in group 16C may have an on-time of 40%. And the LEDs in group 16D may have an on-time of 20%.

As a result of the LED groups 16A-D having different respective on-times, the respective light output of each of the groups 16A-D may have a different brightness. As discussed above, group 16A may have an on-time of 80% and it may have the highest brightness among groups 16A-D, as a result. Group 16B may have an on-time of 60% and it may have the second highest brightness among groups 16A-D. Group 16C may have an on-time of 40% and it may have the third highest brightness among groups 16A-D. And group 16D may have an on-time of 20% and it may have the lowest brightness among groups 16A-D.

Figure 2A:
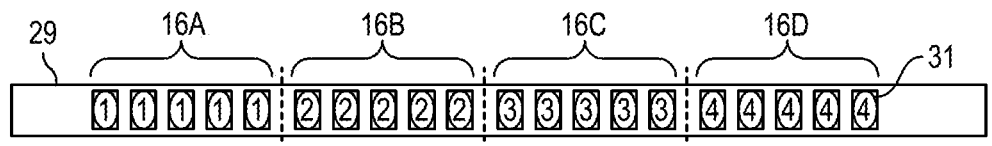
FIG. 2A is a diagram of an example of an LED strip, according to the prior art.
Figure 2B:
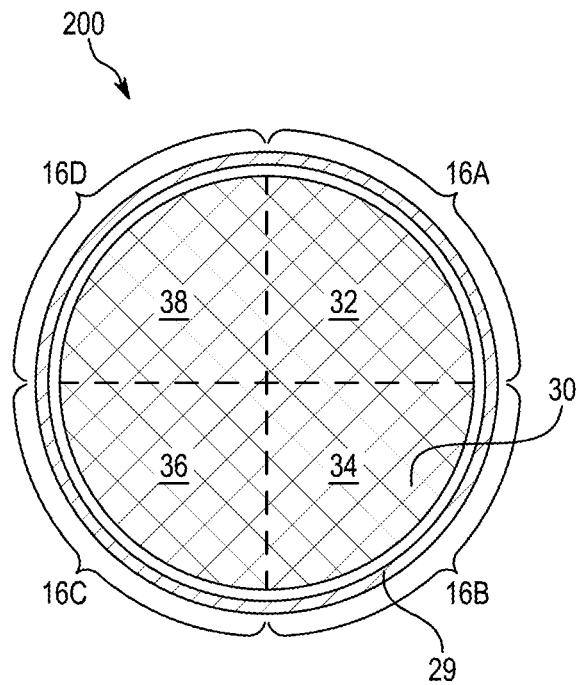
FIG. 2B is a diagram of an example of a light fixture utilizing the LED strip of FIG. 2A, according to the prior art.

FIG. 2A is a diagram of an LED strip 29 including the LED array 16. As illustrated, the LEDs in the LED array 16 may be arranged along the length of the LED strip 29. Each of the groups 16A-D may be arranged in a separate section of the LED strip 29 as shown. FIG. 2B is a diagram of a light fixture 200 including the driver circuit 100, a light guide 30, and the LED strip 29. The LED strip 29 may be coupled to driver circuit 100, such that each of the LED groups 16A-D is electrically connected to a different one of the tap points 19A-D, in the manner illustrated in FIG. 1A. The light guide 30 may include a slate of light-transmissive material (e.g., plastic or glass) and it may be shaped as a disk. The light guide 30 may include quadrants 32, 34, 36, and 38. The LED strip 29 may be edge-coupled to the light guide 30, as shown. More particularly, the LED strip 29 may be disposed adjacently to the outer edge of the light guide 30, such that at least some of the light emitted by the LEDs in the LED array 16 is injected into the light guide through its outer edge. In the present example, the LEDs from group 16A are disposed adjacently to quadrant 32, the LEDs from group 16B are disposed adjacently to quadrant 34, the LEDs from group 16C are disposed adjacently to quadrant 36, and the LEDs from group 16D are disposed adjacently to quadrant 38.

Figure 2C:
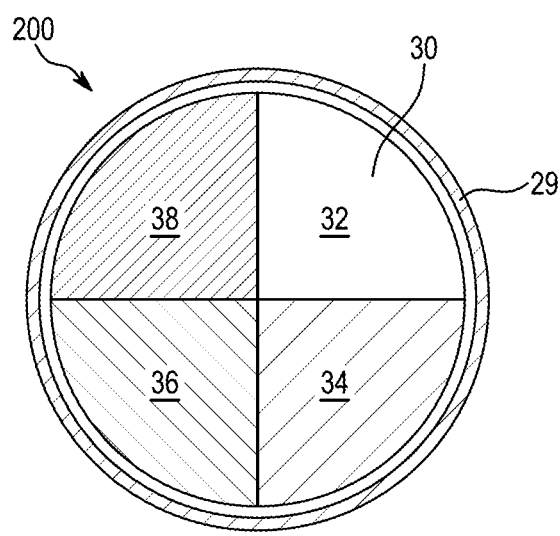
FIG. 2C is diagram illustrating the appearance of the light fixture of FIG. 2A after the light fixture of FIG. 2A is turned on, according to the prior art.

FIG. 2C is a diagram illustrating the light fixture 200, after the light fixture is turned on. As noted above, each of the LED groups 16A-D may be coupled to a different tap point of the driver circuit 100, and it may have a different brightness. As a result, when the light fixture 200 is switched on, it may produce a non-uniform light output. For example, quadrant 32 may appear the brightest, quadrant 34 may appear the second brightest, quadrant 36 may appear the third brightest, and quadrant 38 may appear the least bright. Such lack of uniformity in the light output is undesirable, as many users may find it to be aesthetically unappealing when viewed from a distance.

Figure 3A:
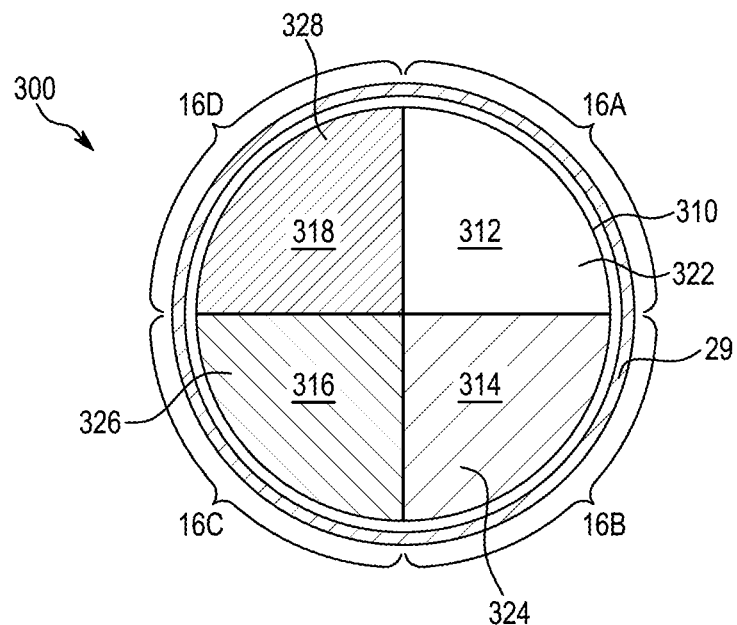
FIG. 3A is a diagram of an example of a light fixture, according to aspects of the disclosure.

FIG. 3A is a diagram of a light fixture 300 including the driver circuit 100, a light guide 310, and the LED strip 29. In the present example, the LED strip 29 may be connected to the driver circuit 100 in the manner discussed with respect to FIGS. 1A-2C. Furthermore, in the present example, each of the LED groups 16A-D may be edge-coupled to a different quadrant of the light guide 310. For instance, the LEDs from group 16A may be edge-coupled to a quadrant 312 of the light guide 310. The LEDs from group 16B may be edge-coupled to a quadrant 314 of the light guide 310. The LEDs from group 16C may be edge-coupled to a quadrant 316 of the light guide 310. And the LEDs from group 16D may be edge-coupled to a quadrant 318 of the light guide 310. According to the present example, the light guide 310 may be shaped as a disk, and each of the quadrants 312-318 may be shaped as a circular sector enclosed by two radii of the disk and a corresponding portion of the outer edge of the disk that extends between the two radii.

According to aspects of the disclosure, each of the quadrants 312-318 may be provided with a different one of light-extraction patterns 322-328. For example, the quadrant 312 may be provided with the light extraction pattern 322. The quadrant 314 may be provided with a light extraction pattern 324. The quadrant 316 may be provided with a light extraction pattern 326. And the quadrant 318 may be provided with a light extraction pattern 328.

Figure 3B:
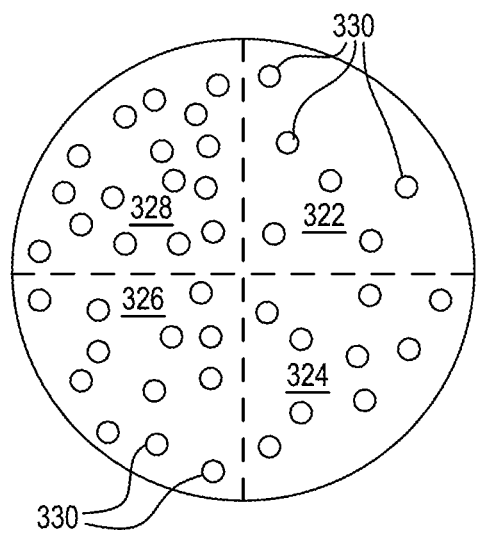
FIG. 3B is a diagram illustrating an example of a plurality of light extraction patterns that is formed on the light fixture of FIG. 3A, according to aspects of the disclosure.

FIG. 3B is a schematic diagram illustrating the light extraction patterns 322-328 in further detail. As shown, each of the light extraction patterns 322-328 may include a different plurality of light extraction features 330. By way of example, any of the light extraction features 330 may include a printed element or a molded element. A printed element may include a dot or another suitable shape that is printed on the surface of the light guide 310. A molded element may include a prism or another suitable shape that is molded on the surface of the light guide 310.

The light-extraction patterns 322-328 may differ from one another in the density of light extraction features 330 that form each of them. For example, the light extraction pattern 322 may have the lowest density of light extraction features 330. The light extraction pattern 324 may have the second lowest density of light extraction features 330. The light extraction pattern 326 may have the third lowest density of light extraction features 330. And the light extraction pattern 328 may have the highest density of light extraction features 330. As used throughout the disclosure, the phrase "density of a light extraction pattern" shall refer to a count of light extraction features that form the light extraction pattern per unit area (e.g., $cm^2$).

According to aspects of the disclosure, the density of the light extraction pattern that is provided on each of the quadrants 312-318 may be inversely proportional to the brightness of the LED group that is edge-coupled to that quadrant. For example, the quadrant 312, which is edge-coupled with the brightest group of LEDs (i.e., group 16A), may be provided with the light extraction pattern having the lowest density of light extraction features 330 (i.e., light extraction pattern 322). As another example, the quadrant 314, which is edge-coupled with the second brightest group of LEDs (i.e., group 16B), may be provided with the light extraction pattern having the second lowest density of light extraction features 330 (i.e., light extraction pattern 324). As yet another example, the quadrant 316, which is edge-coupled with the third brightest group of LEDs (i.e., group 16C), may be provided with the light extraction pattern having the third lowest density of light extraction features 330 (i.e., light extraction pattern 326). As yet another example, the quadrant 318, which is edge-coupled with the least bright group of LEDs (i.e., group 16D), may be provided with the light extraction pattern having the highest density of light extraction features 330 (i.e., light extraction pattern 328).

Figure 3C:
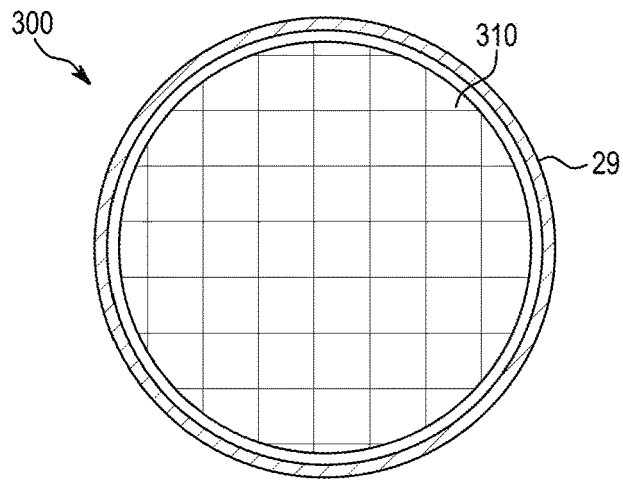
FIG. 3C is diagram illustrating the appearance of the light fixture of FIG. 3A after the light fixture of FIG. 3A is turned on, according to aspects of the disclosure.

FIG. 3C is a diagram illustrating the operation of the light fixture 300 after light fixture is turned on. As illustrated in 3C, as a result of utilizing light extraction patters 322-328, the light fixture 300 is able to produce a substantially uniform light output. Put differently, FIG. 3C illustrates that the light extraction patterns 322-328 may be configured to even out (e.g., eliminate or reduce, etc.) the differences in brightness of the light output by the LED groups 16A-D. As a result, the quadrants 312-318 may appear to have the same or similar brightness. More particularly, the difference in brightness of the light exiting quadrants 312 and 314 of the light guide 310 may lower than if the light extraction patterns 322 and 324 were not formed onto the quadrants 312 and 314. As another example, the difference in brightness of the light exiting quadrants 312 and 318 of the light guide 310 may be lower than if the light extraction patterns 322 and 328 were not formed onto the quadrants 312 and 318.

Although in the example of FIG. 3-C the light guide 310 is disk-shaped, alternative implementations are possible in which the light guide 310 has another shape. For example, the light guide 310 may be shaped as a rectangle, a ring, a rhombus, a trapezoid, a polygon, etc. Furthermore, although in the example of FIGS. 3A-C quadrant 312-318 is shaped as a circular sector, alternative implementations are possible in which any of the quadrants 312-318 has another shape, such as a rectangular shape, a trapezoidal shape, a rhomboid shape, a polygonal shape, etc. The present disclosure is thus not limited to any particular shape for the light guide 310. Furthermore, the present disclosure is not limited to any particular shape and/or position (within the light guide 310) of the quadrants 312-318. Furthermore, although in the example of FIGS. 3A-C the LEDs are coupled to the light guide 310 from all sides (e.g., around the entire circumference of the light guide 310), alternative implementations are possible in which the LEDs are coupled to at least one and fewer than all sides of the light guide 310 (e.g., coupled to only two sides of a rectangular-shaped light guide or coupled to half of the perimeter of a disk-shaped light guide).

Furthermore, although in the example of FIGS. 3A-C the LEDs are edge-coupled to the light guide 310, alternative implementations are possible in which one or more of the LEDs are in-coupled to the light guide 310. When an LED is in-coupled to the light guide 310, that LED may be situated in a hole (e.g., a blind hole or a through hole) that is formed in a main surface of the light guide, such that light emitted from the LED enters the light guide through the walls of the hole. The main surface of the light guide 310 may be the surface on which the light extraction patterns are formed and/or a surface that is opposite to the surface on which the light extraction patterns are formed. For example, in some implementations, when an LED is in-coupled to a given quadrant of a main surface of the light guide 310 (e.g., quadrant 312), that LED may be positioned in a hole that is formed in that quadrant. Additionally or alternatively, when the LEDs in the light fixture 300 are in-coupled to the light guide 310, the LEDs may be concentrated in a particular portion of the light guide 310 or distributed uniformly across the main surface of the light guide 310. Furthermore, in some implementations, one or more of the LEDs in the light fixture 300 may be situated above or below the light guide 310. Stated succinctly, the present disclosure is not limited to any type of coupling between the light guide 310 and the LEDs in the light fixture 300.

Furthermore, although in the example of FIGS. 3A-C the LEDs from groups 16A-D are mounted on a flexible board (i.e., the LED strip 29), alternative implementations are possible in which the LEDs are mounted on a rigid board. Additionally or alternatively, further implementations are possible in which some of the LEDs in the light fixture 300 are coupled to a flexible board (e.g., an LED strip) while the rest is coupled to a rigid board. Additionally or alternatively, in implementations in which the LEDs are in-coupled to the light guide 310, the LED's may be mounted on an in-plane rigid board together with the driver circuit 100. In such instances, the rigid board may be arranged above or below the light guide 310, and it may have the ability to create better thermals and light output uniformity. In some implementations, the in-plane rigid board may be parallel to the light guide's 310 main surfaces.

Figure 4A:
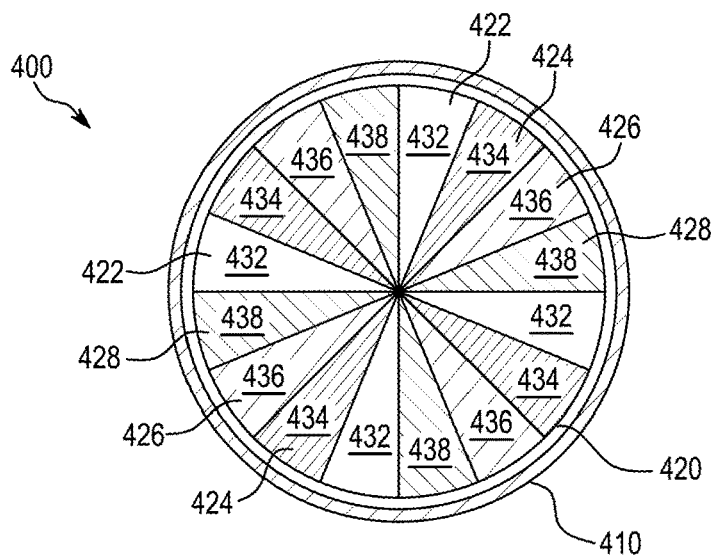
FIG. 4A is a diagram of an example of a light fixture, according to aspects of the disclosure.

FIG. 4A is a diagram of an example of a light fixture 400, according to aspects of the disclosure. The light fixture 400 may include an LED strip 410 that is edge-coupled to a light guide 420, as shown. The light fixture 400 may be electrically coupled to the driver circuit 100 (shown in FIG. 1). The driver circuit 100 may be integrated into the light fixture 400 or provided separately.

Figure 4B:
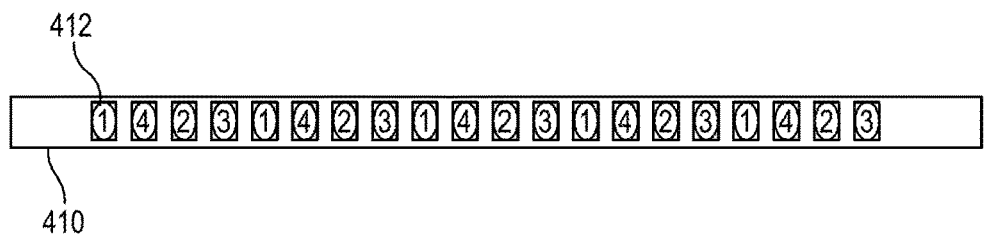
FIG. 4B is a diagram illustrating an example of an LED strip that is used in the light fixture of FIG. 4A, according to aspects of the disclosure.

FIG. 4B shows the LED strip 410 in further detail. As illustrated, the LED strip 410 may include a plurality of LEDs 412. The LEDs 412 may be arranged in four groups, herein referred to as a "Group 1", "Group 2", "Group 3", and "Group 4." According to FIG. 4B, the group to which each of the LEDs 412 belongs is denoted by the numerical identifier that is present inside the depiction of that LED 412.

The LEDs 412 may be coupled to the driver circuit 100, in accordance with the topology shown in FIG. 1A. More particularly, the LEDs in each of Groups 1-4 may be connected in series to one another. Furthermore, Groups 1-4 may be connected to one another in series, as well. For example, Group 1 and Group 2 may both be coupled to a first node which is located downstream from Group 1 and upstream from Group 2. Group 2 and Group 3 may both be coupled to a second node which is located downstream from Group 2 and upstream from Group 3. Group 3 and Group 4 may both be coupled to a third node which is located downstream from Group 3 and upstream from Group 4. Group 4 may also be coupled to a fourth node that is located downstream from Group 4.

Moreover, according to the topology shown in FIG. 1A, each of the nodes 20A-20B may be coupled to a different one of the tap points 19A-D. More particularly, the first node may be coupled to the tap point 19A via a first electrical path. The second node may be coupled to the tap point 19B via a second electrical path. The third node may be coupled to the tap point 19C via a third electrical path. And the fourth node may be coupled to the tap point 19D via a fourth electrical path. By way of example, in some implementations, the first, second, third, and fourth electrical paths may be completely disjoint. Additionally or alternatively, in some implementations, the first, second, third, and fourth electrical paths may be parallel to one another. Stated succinctly, in some implementations, Groups 1-4 may be connected to different respective tap points of the driver circuit 100 in the same manner as groups 16A-D.

As noted above, in accordance with the example of FIG. 4A, the LEDs in each of Groups 1-4 may be coupled to a different tap point of the driver circuit 100. For example, the LEDs in Group 1 may be coupled to the tap point 19A and they may have the longest on-time and highest brightness. The LEDs in Group 2 may be coupled to the tap point 19B and they may have the second longest on-time and the second highest brightness. The LEDs in Group 3 may be coupled to the tap point 19C and they may have the third longest on-time and the third highest brightness. The LEDs in Group 4 may be coupled to the tap point 19D and they may have the shortest on-time and lowest brightness.

The LEDs in Groups 1-4 may have a different spatial distribution than the LEDs in groups 16A-D. As illustrated in FIG. 2A, the LEDs in each of Groups 16A-B may be positioned next to each other. By contrast, as illustrated in FIG. 4B, the LEDs in Groups 1-4 may be interleaved with one another, such that each LED 412 (but for the first and last LEDs 412) is situated between LEDs 412 from two different groups.

Returning to FIG. 4A, the light guide 420 may be divided into portions 422-428, as shown. Each of the portions 422-428 may be provided with a different light extraction pattern. For example, each portion 422 may be provided with a light extraction pattern 432 and edge-coupled with a different LED from Group 1. Each portion 424 may be provided with a light extraction pattern 434 and edge-coupled with a different LED from Group 2. Each portion 426 may be provided with a light extraction pattern 436 and edge-coupled with a different LED from Group 3. And each portion 426 may be provided with a light extraction pattern 436 and edge-coupled with a different LED from Group 4. The light extraction pattern 432 may be the same or similar to the light extraction pattern 322. The light extraction pattern 434 may be the same or similar to the light extraction pattern 324. The light extraction pattern 436 may be the same or similar to the light extraction pattern 326. And the light extraction pattern 438 may be the same or similar to the light extraction pattern 328.

The portions 422-428 are provided with different light extraction patterns to compensate for differences in brightness between the LEDs from different groups. The light extraction patterns 432-438 may each include a different plurality of light extraction features (not shown), as discussed with respect to FIGS. 3A-C. The light extraction patterns may differ from one another in the density of their respective light extraction features. More specifically, the light extraction pattern 432 may have the lowest density of light extraction features among the light extraction patterns 432-438. The light extraction pattern 434 may have the second lowest density of light extraction features among the light extraction patterns 432-438. The light extraction pattern 436 may have the third lowest density of light extraction features among the light extraction patterns 432-438. And, the light extraction pattern 438 may have the highest density of light extraction features among the light extraction patterns 432-438.

According to aspects of the disclosure, the density of the light extraction pattern that is provided on each of the portions 422-428 may be inversely proportional to the brightness of the LED that is edge-coupled to that portion. For example, each portion 422, which may be edge-coupled with an LED from the brightest group (i.e., Group 1), may be provided with the light extraction pattern having the lowest density of light extraction features (i.e., light extraction pattern 432). As another example, each portion 424, which may be edge-coupled with an LED from the second brightest group (i.e., Group 2), may be provided with the light extraction pattern having the second lowest density of light extraction features (i.e., light extraction pattern 434). As yet another example, each portion 426, which may be edge-coupled with an LED from the third brightest group (i.e., Group 3), may be provided with the light extraction pattern having the third lowest density of light extraction features (i.e., light extraction pattern 436). As yet another example, each portion 428, which may be edge-coupled with an LED from the least bright group (i.e., Group 4), may be provided with the light extraction pattern having the highest density of light extraction features (i.e., light extraction pattern 438).

Figure 4C:
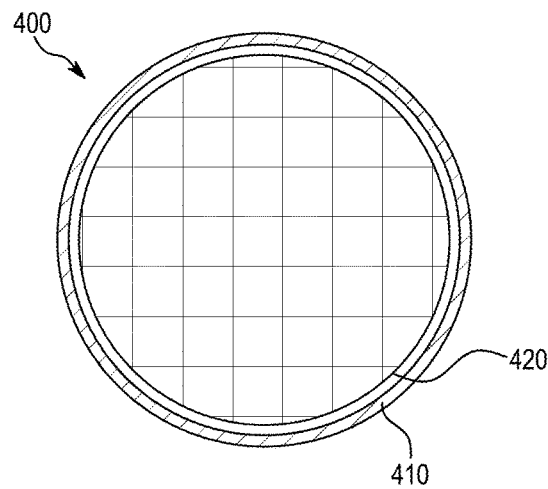
FIG. 4C is diagram illustrating the appearance of the light fixture of FIG. 4A after the light fixture of FIG. 4A is turned on, according to aspects of the disclosure.

FIG. 4C is a diagram illustrating the operation of the light fixture 400 after light fixture is turned on. As illustrated in FIG. 4C, as a result of utilizing the light extraction patters 432-438, the light fixture 400 may produce a substantially uniform light output. Put differently, FIG. 4C illustrates that the light extraction patterns 432-438 may be configured to even out (e.g., eliminate and/or reduce) the differences in brightness of the light output by the LED Groups 1-4. As a result, the portions 422-428 may appear to have the same or similar brightness. More particularly, the difference in brightness of the light exiting portions 422 and 424 of the light guide 420 may be lower than if the light extraction patterns 432 and 434 were not formed onto the portions 422 and 424. As another example, the difference in brightness of the light exiting portions 422 and 428 of the light guide 420 may be lower than if the light extraction patterns 432 and 438 were not formed onto the portions 422 and 428.

Although in the example of FIGS. 4A-C the light guide 420 is disk-shaped, alternative implementations are possible in which the light guide 420 has another shape. For example, the light guide 420 may be shaped as a rectangle, a ring, a rhombus, a trapezoid, a polygon, etc. Furthermore, although in the example of FIGS. 4A-C portion 422-428 is shaped as a circular sector, alternative implementations are possible in which any of the portions 422-428 has another shape, such as a rectangular shape, a trapezoidal shape, a rhomboid shape, a polygonal shape, etc. The present disclosure is thus not limited to any particular shape for the light guide 420. Furthermore, the present disclosure is not limited to any particular shape and/or position (within the light guide 420) of the portions 422-428. Furthermore, although in the example of FIGS. 4A-C the LEDs are coupled to the light guide 420 from all sides (e.g., around the entire circumference of the light guide 420), alternative implementations are possible in which the LEDs are coupled to at least one and fewer than all sides of the light guide 420 (e.g., coupled to only two sides of a rectangular-shaped light guide or coupled to half of the perimeter of a disk-shaped light guide).

Furthermore, although in the example of FIGS. 4A-C the LEDs are edge-coupled to the light guide 420, alternative implementations are possible in which one or more of the LEDs are in-coupled to the light guide 420. When an LED is in-coupled to the light guide 420, the LEDs may be situated in a hole that is formed in the light guide 420, such that light emitted from the LEDs enters the light guide 420 through the walls of the hole. The main surface of the light guide 420 may be the surface on which the light extraction patterns are formed and/or a surface that is opposite to the surface on which the light extraction patterns are formed. For example, in some implementations, when an LED is in-coupled to a given portion of a main surface of the light guide 420 (e.g., portion 422), that LED may be positioned in a hole that is formed in the portion. Additionally or alternatively, when the LEDs in the light fixture 400 are in-coupled to the light guide 420, the LEDs may be concentrated in a particular portion of the light guide 420 or distributed uniformly across the main surface of the light guide 420. Furthermore, in some implementations, one or more of the LEDs in the light fixture 400 may be situated above ore below the light guide 420. Stated succinctly, the present disclosure is not limited to any type of coupling between the light guide 420 and the LEDs in the light fixture 400.

Furthermore, although in the example of FIGS. 4A-C the LEDs are mounted on a flexible board (i.e., the LED strip 410), alternative implementations are possible in which the LEDs are mounted on a rigid board. Additionally or alternatively, further implementations are possible in which some of the LEDs in the light fixture 400 are coupled to a flexible board (e.g., an LED strip) while the rest is coupled to a rigid board. Additionally or alternatively, in implementations in which the LEDs are in-coupled to the light guide 420, the LED's may be mounted on an in-plane rigid board together with the driver circuit 100. In such instances, the rigid board may be arranged above or below the light guide 420, and it may have the ability to create better thermals and light output uniformity. In some implementations, the in-plane rigid board may be parallel to the light guide's 420 main surfaces.

Figure 5A:
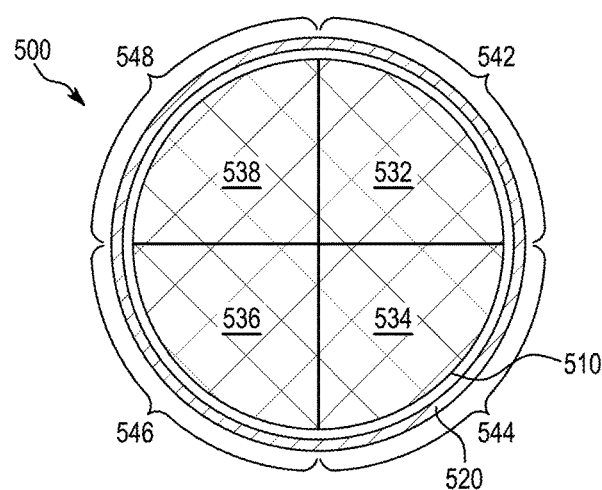
FIG. 5A is a diagram of an example of a light fixture, according to aspects of the disclosure.

FIG. 5A is a diagram of an example of a light fixture 500, according to aspects of the disclosure. The light fixture 500 may include a light guide 510 and an LED strip 520. The light guide 510 may be provided with the same light extraction pattern across the entire surface of the light guide 510. The LED strip 520 may be edge-coupled to the light guide 510. The LED strip 520 may be electrically coupled to the driver circuit 100 (shown in FIG. 1). The driver circuit 100 may be integrated into the light fixture 500 or provided separately.

Figure 5B:
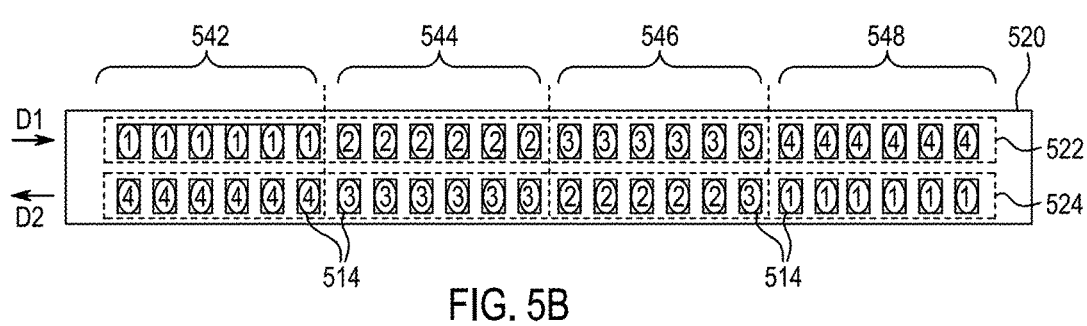
FIG. 5B is a diagram illustrating an example of an LED strip that is used in the light fixture of FIG. 5A, according to aspects of the disclosure.

FIG. 5B shows the LED strip 520 in further detail. As illustrated, the LED strip 520 may include an LED array 522 and an LED array 524. Each of the arrays 522 and 524 may include a plurality of LEDs 514. The LEDs 514 in each one of the arrays 522 and 524 may be arranged in four groups, herein referred to as a "Group 1", "Group 2", "Group 3", and "Group 4." The group to which each of the LEDs 514 belongs is denoted in FIG. 5B by the numerical identifier that is present inside the depiction of that LED 514. The LEDs in each of the LED groups may be disposed adjacently to one another on the LED strip 520, as shown. Although in the present example, the LED arrays 522 and 524 are part of the same LED strip, alternative implementations are possible in which the LED arrays 522 and 524 are part of two adjacent (and/or identical) LED strips.

Moreover, in some implementations, when the LED strip 520 is energized, current may flow through the LED arrays 522 and 524 in opposite directions. For example, the current may flow through array 522 in direction D1 while flowing through array 524 in direction D2 that is opposite the direction D1. In some implementations, when each of the LED arrays 522 and 524 is implemented as a separate LED strip, the arrangement depicted with respect to FIGS. 5A-C may be achieved by simply wrapping the LED strips around the light guide 510 in opposite directions.

The LEDs 514 in Groups 1-4 may be coupled to the driver circuit 100, in accordance with the topology shown in FIG.

1A. More particularly, the LEDs in each of Groups 1-4 may be connected in series to one another. Furthermore, Groups 1-4 may be connected to one another in series, as well. For example, Group 1 and Group 2 may both be coupled to a first node which is located downstream from Group 1 and upstream from Group 2. Group 2 and Group 3 may both be coupled to a second node which is located downstream from Group 2 and upstream from Group 3. Group 3 and Group 4 may both be coupled to a third node which is located downstream from Group 3 and upstream from Group 4. Group 4 may also be coupled to a fourth node that is located downstream from Group 4.

Moreover, according to the topology shown in FIG. 1A, each of the nodes may be coupled to a different one of the tap points 19A-D. More particularly, the first node may be coupled to the tap point 19A via a first electrical path. The second node may be coupled to the tap point 19B via a second electrical path. The third node may be coupled to the tap point 19C via a third electrical path. And the fourth node may be coupled to the tap point 19D via a fourth electrical path. By way of example, in some implementations, the first, second, third, and fourth electrical paths may be completely disjoint. Additionally or alternatively, in some implementations, the first, second, third, and fourth electrical paths may be parallel to one another. Stated succinctly, in some implementations, Groups 1-4 may be connected to different respective tap points of the driver circuit 100 in the same manner as groups 16A-D.

As noted above, according to the example of FIG. 5A, the LEDs in Groups 1, in both of LED arrays 522 and 524, may be coupled to the tap point 19A of the driver circuit 100. The LEDs in Groups 2, in both of LED arrays 522 and 524, may be coupled to the tap point 19B of the driver circuit 100. The LEDs in Groups 3, in both of LED arrays 522 and 524, are may be coupled to the tap point 19C of the driver circuit 100. And the LEDs in Groups 4, in both of LED arrays 522 and 524, may be coupled to the tap point 19D of the driver circuit 100. As a result of this connectivity, the LEDs in each of Groups 1-4 may have a different respective on-time. For example, the LEDs in each Group 1 may have an on-time of 80%. The LEDs in each Group 2 may have an on-time of 60%. The LEDs in each Group 3 may have an on-time of 40%. And the LEDs in each Group 4 may have an on-time of 20%. As a result of having different respective on-times, the light output of each LED group may have a different brightness. For example, the light output of Group 1 may have the highest brightness, the light output of Group 2 may have the second highest brightness, the light output of Group 3 may have the third highest brightness, and the light output of Group 4 may have the lowest brightness.

The LED strip 520 may include sections 542-548. Each section may include one respective group from the LED array 522 and a different respective group from the LED array 524. For example, section 542 may include the LEDs from Group 1 of the LED array 522 and the LEDs from Group 4 of the LED array 524. Section 544 may include the LEDs from Group 2 of the LED array 522 and the LEDs from Group 3 of the LED array 524. Section 546 may include the LEDs from Group 3 of the LED array 522 and the LEDs from Group 2 of the LED array 524. And finally, section 548 may include the LEDs from Group 4 of the LED array 522 and the LEDs from Group 1 of the LED array 524.

The LED groups in each of the sections 542-548 may balance each other out to produce a light output having the same average brightness. As can be readily appreciated, each of the sections 542-548 may have an average on-time of 50%, as a result of containing two different groups of LEDs. Because the LEDs in each section 542-548 are located adjacently to one another, their output may mix inside the light guide 510 to create the appearance that the light output of each of the sections 542-548 has the same brightness. In other words, because each of the LEDs in each of the sections have the same average on-time, the light output that is produced by each of the sections 542-548 of the LED strip 520 may appear to have the same or similar brightness.

The light guide 510 may include respective quadrants 532-538. Each of the quadrants 532-538 may be edge-coupled to a different section of the LED strip 520. For example, section 542 of the LED strip 520 may be edge-coupled to the outer edge of the quadrant 532. Section 544 of the LED strip 520 may be edge-coupled to the outer edge of the quadrant 534. Section 546 of the LED strip 520 may be edge-coupled to the outer edge of the quadrant 536. And section 548 of the LED strip 520 may be edge-coupled to the outer edge of the quadrant 538.

Figure 5C:
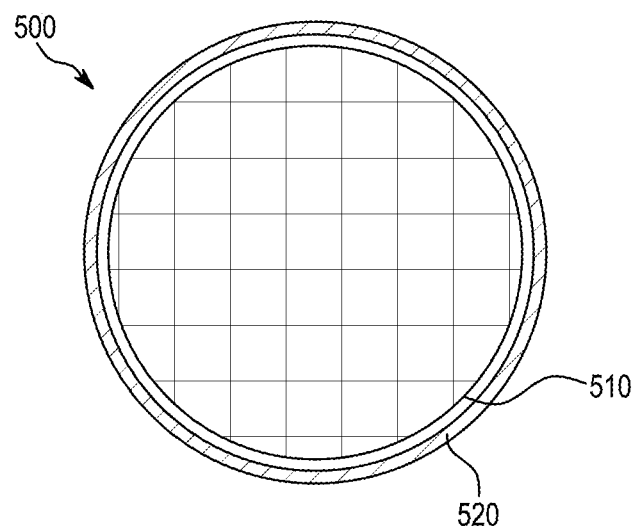
FIG. 5C is diagram illustrating the appearance of the light fixture of FIG. 5A after the light fixture of FIG. 5A is turned on, according to aspects of the disclosure.

FIG. 5C illustrates the appearance of the light fixture 500 when the light fixture is switched on. As illustrated, the light fixture 500 may appear to have a substantially uniform brightness across the entire surface of the light guide 510. As noted above, the appearance of substantially uniform brightness may be the result of each of the sections 542-548 of the LED strip 520 having the same (or similar) average on-time. In the example of FIGS. 5A-C the light guide 510 is shaped as a disk, and each of the quadrants 532-538 is shaped as a circular sector. However, alternative implementations are possible in which any of the light guide 510 and the quadrants 532-538 has a different shape, such as a rectangular shape for example.

Figure 6A:
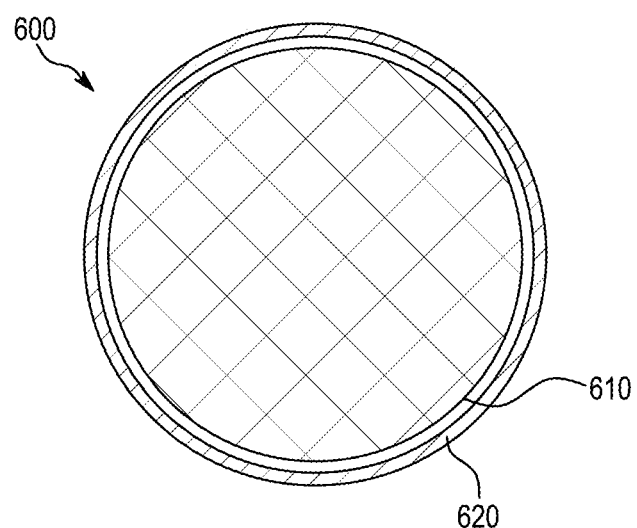
FIG. 6A is a diagram of an example of a light fixture, according to aspects of the disclosure.

FIG. 6A is a diagram of an example of a light fixture 600, according to aspects of the disclosure. The light fixture 600 may include a light guide 610 and an LED strip 620. The light guide 610 may be provided with the same light extraction pattern across the entire surface of the light guide 610. The LED strip 620 may be edge-coupled to the light guide 610. The LED strip 620 may be electrically coupled to the driver circuit 100 (shown in FIG. 1A). The driver circuit 100 may be integrated into the light fixture 600 or provided separately.

Figure 6B:
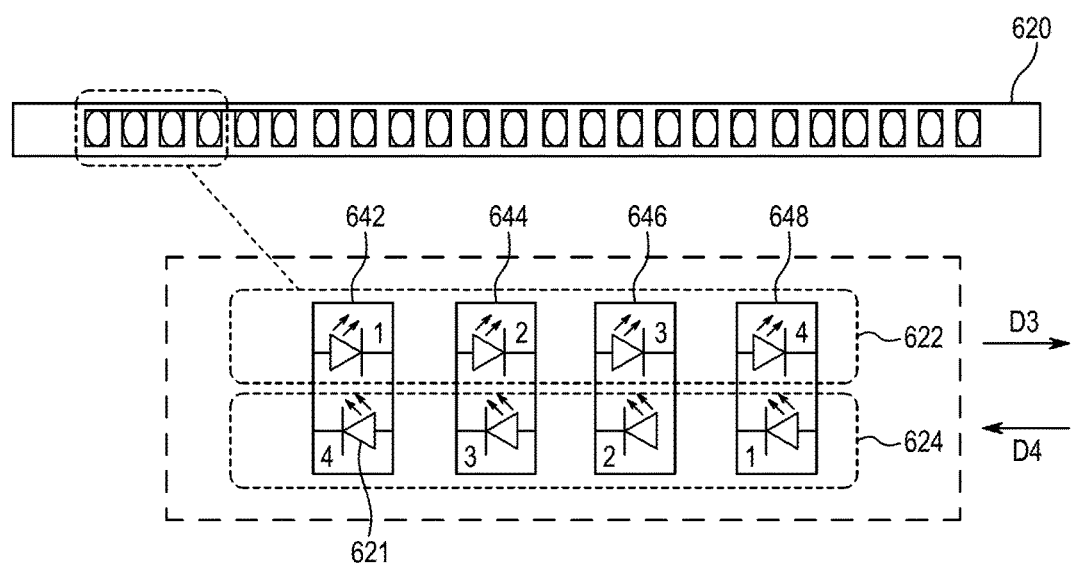
FIG. 6B is a diagram illustrating an example of an LED strip that is used in the light fixture of FIG. 6A, according to aspects of the disclosure.

FIG. 6B shows the LED strip 620 in further detail. As illustrated, the LED strip 620 may include an LED array 622 and LED array 624. Each of the LED arrays 622 and 624 may include a plurality of LEDs 621. The LEDs 621 in each one of the arrays 622 and 644 may be arranged in four groups, herein referred to as a "Group 1", "Group 2", "Group 3", and "Group 4." The group to which each of the LEDs 621 belongs is denoted in FIG. 6B by the numerical identifier that is present adjacently to the depiction of that LED 621.

The LEDs 621 may be coupled to the driver circuit 100, in accordance with the topology shown in FIG. 1A. More particularly, the LEDs in each of Groups 1-4 may be connected in series to one another. Furthermore, Groups 1-4 may be connected to one another in series, as well. For example, Group 1 and Group 2 may both be coupled to a first node which is located downstream from Group 1 and upstream from Group 2. Group 2 and Group 3 may both be coupled to a second node which is located downstream from Group 2 and upstream from Group 3. Group 3 and Group 4 may both be coupled to a third node which is located downstream from Group 3 and upstream from Group 4. Group 4 may also be coupled to a fourth node that is located downstream from Group 4.

Moreover, according to the topology shown in FIG. 1A, each of the nodes may be coupled to a different one of the tap points 19A-D. More particularly, the first node may be coupled to the tap point 19A via a first electrical path. The second node may be coupled to the tap point 19B via a second electrical path. The third node may be coupled to the tap point 19C via a third electrical path. And the fourth node may be coupled to the tap point 19D via a fourth electrical path. By way of example, in some implementations, the first, second, third, and fourth electrical paths may be completely disjoint. Additionally or alternatively, in some implementations, the first, second, third, and fourth electrical paths may be parallel to one another. Stated succinctly, in some implementations, Groups 1-4 may be connected to different respective tap points of the driver circuit 100 in the same manner as groups 16A-D.

As noted above, in some implementations, the LEDs in Group 1, in both of the LED arrays 622 and 624, may be coupled to the tap point 19A of the driver circuit 100. The LEDs in Group 2, in both of LED arrays 622 and 624, may be coupled to the tap point 19B of the driver circuit 100. The LEDs in Group 3, in both of LED arrays 622 and 624, may be coupled to the tap point 19C of the driver circuit 100. And the LEDs in Group 4, in both of LED arrays 622 and 624, may be coupled may be coupled to the tap point 19D of the driver circuit 100. As a result of this connectivity, the LEDs in each of Groups 1-4 may have a different respective on-time. For example, the LEDs in Group 1 may have an on-time of 80%. The LEDs in Group 2 may have an on-time of 60%. The LEDs in Group 3 may have an on-time of 40%. And the LEDs in Group 4 may have an on-time of 20%. As a result of having different respective on-times, the light output of each LED group may have a different brightness. For example, the light output of the LEDs in Group 1 may have the highest brightness, the light output of the LEDs in Group 2 may have the second highest brightness, the light output of the LEDs Group 3 may have the third highest brightness, and the light output of the LEDs in Group 4 may have the lowest brightness.

The LED strip 620 may include sections 642-648. Each section may include one LED from one group and another LED from another group. For example, each section 642 may include LEDs from Groups 1 and 4, respectively. Each section 642 may include LEDs from Groups 2 and 3, respectively. Each section 646 may include LEDs from Groups 3 and 2, respectively. And each section 648 may include LEDs from Groups 4 and 1, respectively. In some implementations, the LEDs in each section may belong to different ones of the LED arrays 622 and 624. Moreover, in some implementations, the LEDs in each section may be contained in the same package. In such instances, the LEDs in each section/package may be situated very close to each other and make use of shared optics. The small distance and the use of shared optics may further help to blend the output of the LEDs in each section.

The LEDs in each of the sections 642-648 may balance each other out to produce a light output having the same average brightness. As can be readily appreciated, each of the sections 642-648 may have an average on-time of 50%, as a result of containing LEDs from two different groups of LEDs. Because the LEDs in each section 642-648 are located adjacently to one another, their output may be mixed in the light guide 610 (and/or by shared LED packaging optics) to create the appearance of the light output of each of the sections 642-648 having the same or similar brightness. In other words, because the sections 642-648 may have the same average on-time, the light output that is produced by each of the sections 642-648 may appear to have the same or similar brightness.

Figure 6C:
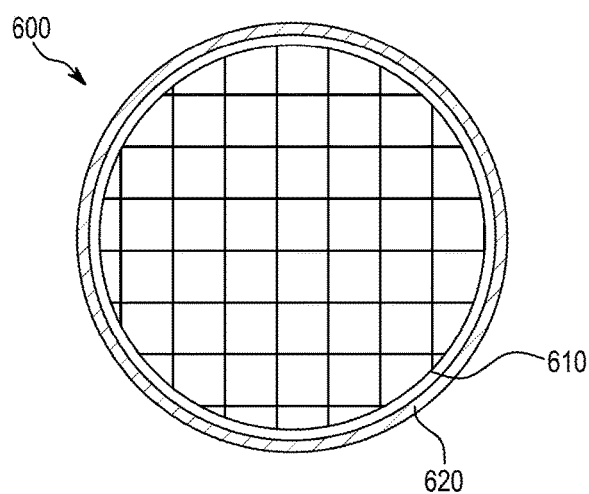
FIG. 6C is diagram illustrating the appearance of the light fixture of FIG. 6A after the light fixture of FIG. 6A is turned on, according to aspects of the disclosure.

FIG. 6C illustrates the appearance of the light fixture 600 when the light fixture is switched on, according to aspects of the disclosure. As illustrated, the light fixture 600 may appear to have a substantially uniform brightness across the entire surface of the light guide 610. As noted above, the appearance of substantially uniform brightness may be the result of each of the sections 642-648 of the LED strip 620 having the same (or similar) average on-time. Additionally or alternatively, the appearance of substantially uniform brightness may be the result of the LEDs in each of the sections 642-648 being located in close proximity to one another and/or in the same package.

Figure 7A:
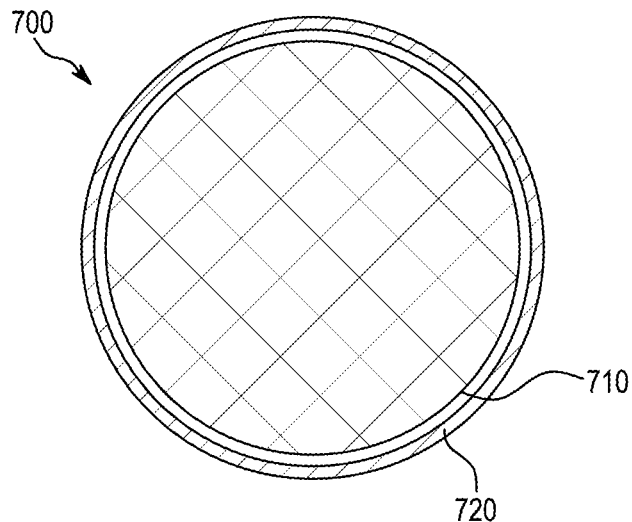
FIG. 7A is a diagram of an example of a light fixture, according to aspects of the disclosure.

FIG. 7A is a diagram of an example of a light fixture 700, according to aspects of the disclosure. The fixture 700 may include a light guide 710 and an LED strip 720. The light guide 710 may be provided with the same light extraction pattern across the entire surface of the light guide 710. The LED strip 720 may be edge-coupled to the light guide 710. The LED strip 720 may be electrically coupled to the driver circuit 100 (shown in FIG. 1). The driver circuit 100 may be integrated into the fixture 700 or provided separately.

Figure 7B:
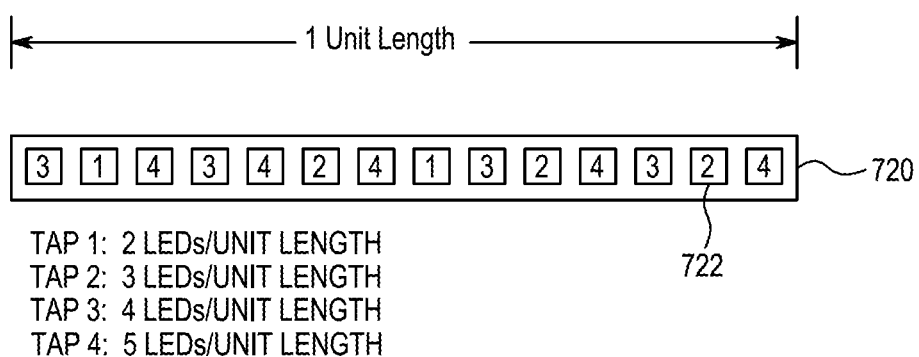
FIG. 7B is a diagram illustrating an example of an LED strip that is used in the light fixture of FIG. 7A, according to aspects of the disclosure.

FIG. 7B shows the LED strip 720 in further detail. As illustrated, the LED strip 720 may include a plurality of LEDs 722. The LEDs 722 may be arranged in four groups, herein referred to as a "Group 1", "Group 2", "Group 3", and "Group 4." The group to which each of the LEDs 722 belongs is denoted in FIG. 7B by the numerical identifier that is present inside the depiction of that LED 722.

The LEDs 722 may be coupled to the driver circuit 100, in accordance with the topology shown in FIG. 1A. More particularly, the LEDs in each of Groups 1-4 may be connected in series to one another. Furthermore, Groups 1-4 may also be connected in series. For example, Group 1 and Group 2 may both be coupled to a first node which is located downstream from Group 1 and upstream from Group 2. Group 2 and Group 3 may both be coupled to a second node which is located downstream from Group 2 and upstream from Group 3. Group 3 and Group 4 may both be coupled to a third node which is located downstream from Group 3 and upstream from Group 4. Group 4 may also be coupled to a fourth node that is located downstream from Group 4.

Moreover, according to the topology shown in FIG. 1A, each of the nodes may be coupled to a different one of the tap points 19A-D. More particularly, the first node may be coupled to the tap point 19A via a first electrical path. The second node may be coupled to the tap point 19B via a second electrical path. The third node may be coupled to the tap point 19C via a third electrical path. And the fourth node may be coupled to the tap point 19D via a fourth electrical path. By way of example, in some implementations, the first, second, third, and fourth electrical paths may be completely disjoint. Additionally or alternatively, in some implementations, the first, second, third, and fourth electrical paths may be parallel to one another. Stated succinctly, in some implementations, Groups 1-4 may be connected to different respective tap points of the driver circuit 100 in the same manner as groups 16A-D.

As noted above, the LEDs 722 in Group 1 may be coupled to the tap point 19A of the driver circuit 100 and may have an on-time of 80%, as a result. The LEDs 722 in Group 2 may be coupled to the tap point 19B of the driver circuit 100 and may have an on-time of 60%, as a result. The LEDs 722 in Group 3 may be coupled to the tap point 19C of the driver circuit 100 and may have an on-time of 40%, as a result. And the LEDs 722 in Group 4 may be coupled to the tap point 19D of the driver circuit 100 and may have an on-time of 20%, as a result. Consequently, the LEDs in Group 1 may have the highest brightness among the LEDs in Groups 1-4; the LEDs in Group 2 may have the second highest brightness among the LEDs in Groups 1-4; the LEDs in Group 3 may have the third highest brightness among the LEDs in Groups 1-4; and the LEDs in Group 4 may have the lowest brightness among the LEDs in Groups 1-4.

Furthermore, in some implementations, the LEDs from Groups 1-4 may be distributed unevenly along the length of the LED strip 720. For example, each unit length of the LED strip 720 may include two LEDs from group 1, three LEDs from Group 3, four LEDs from Group 3, and 5 LEDs from Group 4. In some implementations, each of Groups 1-4 may include a different number of LEDs. In such instances, the driver circuit 100 may be designed such that the voltage range assigned to each of the taps 16A-D is approximately that of the voltage drop for each of the groups.

Figure 8A:
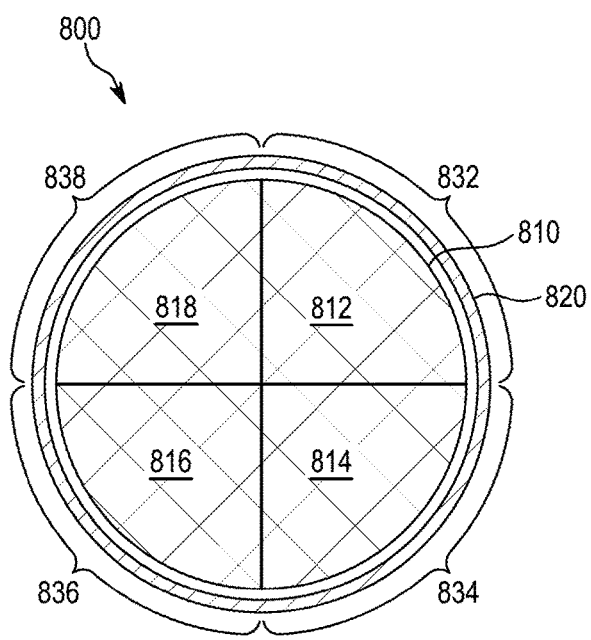
FIG. 8A is a diagram of an example of a light fixture, according to aspects of the disclosure.
Figure 8B:
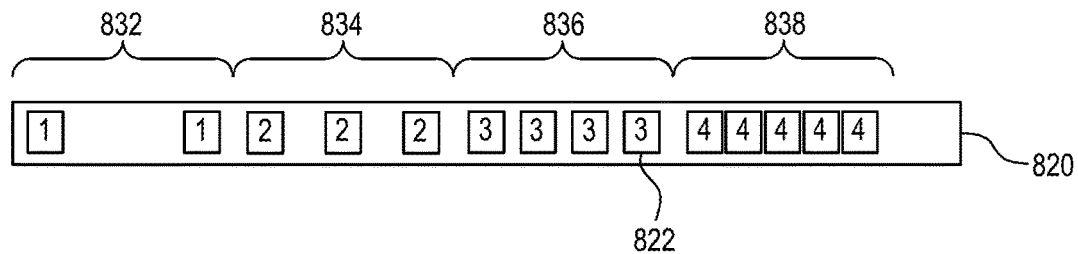
FIG. 8B is a diagram illustrating an example of an LED strip that is used in the light fixture of FIG. 8A, according to aspects of the disclosure.

FIG. 8A is a diagram of an example of a light fixture 800, according to aspects of the disclosure. The light fixture 800 may include a light guide 810 and an LED strip 820. The light guide 810 may include quadrants 812-818 may be provided with the same light extraction pattern across the entire surface of the light guide 810. The LED strip 820 may be edge-coupled to the light guide 810. As shown in FIG. 8B, the LED strip 820 may include sections 832-834. Section 832 may be edge-coupled to quadrant 812, section 834 may be edge-coupled to quadrant 814, section 836 may be edge-coupled to quadrant 816, and section 838 may be edge-coupled to quadrant 818. The LED strip 820 may be powered using the driver circuit 100. The driver circuit 100 may be integrated into the light fixture 800 or provided separately.

FIG. 8B shows the LED strip 820 in further detail. As illustrated, the LED strip 820 may include a plurality of LEDs 822. The LEDs 822 may be arranged in four groups, herein referred to as a "Group 1", "Group 2", "Group 3", and "Group 4." The group to which each of the LEDs 822 belongs is denoted in FIG. 8B by the numerical identifier that is present inside the depiction of that LED 822.

The LEDs 822 may be coupled to the driver circuit 100, in accordance with the topology shown in FIG. 1A. More particularly, the LEDs 822 in each of Groups 1-4 may be connected in series to one another. Furthermore, Groups 1-4 may be connected to one another in series, as well. For example, Group 1 and Group 2 may both be coupled to a first node which is located downstream from Group 1 and upstream from Group 2. Group 2 and Group 3 may both be coupled to a second node which is located downstream from Group 2 and upstream from Group 3. Group 3 and Group 4 may both be coupled to a third node which is located downstream from Group 3 and upstream from Group 4. Group 4 may also be coupled to a fourth node that is located downstream from Group 4.

Moreover, according to this topology, each of the nodes may be coupled to a different one of the tap points 19A-D. More particularly, the first node may be coupled to the tap point 19A via a first electrical path. The second node may be coupled to the tap point 19B via a second electrical path. The third node may be coupled to the tap point 19C via a third electrical path. And the fourth node may be coupled to the tap point 19D via a fourth electrical path. By way of example, in some implementations, the first, second, third, and fourth electrical paths may be completely disjoint. Additionally or alternatively, in some implementations, the first, second, third, and fourth electrical paths may be parallel to one another. Stated succinctly, in some implementations, Groups 1-4 may be connected to different respective tap points of the driver circuit 100 in the same manner as groups 16A-D.

As noted above, the LEDs 822 in Group 1 may be coupled to the tap point 19A of the driver circuit 100 and may have an on-time of 80%, as a result. The LEDs 822 in Group 2 may be coupled to the tap point 19B of the driver circuit 100 and may have an on-time of 60%, as a result. The LEDs 822 in Group 3 may be coupled to the tap point 19C of the driver circuit 100 and may have an on-time of 40%, as a result. And the LEDs 822 in Group 4 may be coupled to the tap point 19D of the driver circuit 100 and may have an on-time of 20%, as a result. Consequently, the LEDs in Group 1 may have the highest brightness among the LEDs in Groups 1-4; the LEDs in Group 2 may have the second highest brightness among the LEDs in Groups 1-4; the LEDs in Group 3 may have the third highest brightness among the LEDs in Groups 1-4; and the LEDs in Group 4 may have the lowest brightness among the LEDs in Groups 1-4.

In some implementations, Group 1 may include 2 LEDs, Group 2 may include 3 LEDs, and Groups 3 and 4 may include 4 LEDs each. Furthermore, in some implementations, each of the Groups 1-4 may be disposed in a different section of the LED strip 820. For example, the LEDs from Group 1 may be disposed in the section 832. The LEDs from Group 2 may be disposed in the section 834. The LEDs from Group 3 may be disposed in the section 836. And the LEDs from Group 4 may be disposed in the section 838. In some implementations, as illustrated in FIG. 8B, sections 832-838 may have the same length. Additionally or alternatively, in some implementations, the distance between the LEDs in each section may vary. For example, the LEDs in section 832 may be further apart from one another than the LEDs in section 834. The LEDs in section 834 may be further apart from one another than the LEDs in section 836. And the LEDs in section 836 may be apart by the same distance as the LEDs in section 838.

Figure 9A:
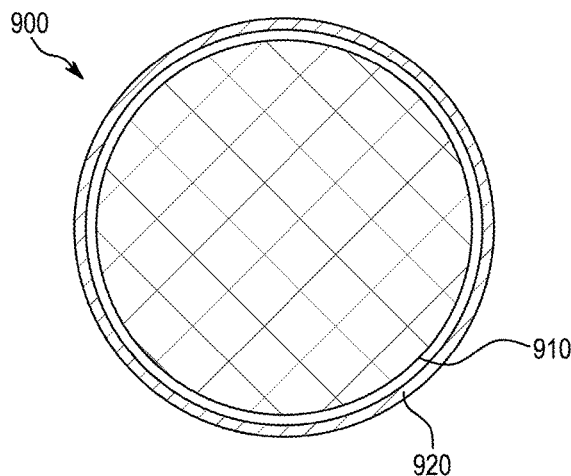
FIG. 9A is a diagram of an example of a light fixture, according to aspects of the disclosure.

FIG. 9A is a diagram of an example of a light fixture 900, according to aspects of the disclosure. The fixture 900 may include a light guide 910 and an LED strip 920. The light guide 910 may be provided with the same light extraction pattern across the entire surface of the light guide 910. The LED strip 920 may be edge-coupled to the light guide 910. The LED strip 920 may be electrically coupled to the driver circuit 100 (shown in FIG. 1). The driver circuit 100 may be integrated into the fixture 900 or provided separately.

Figure 9B:
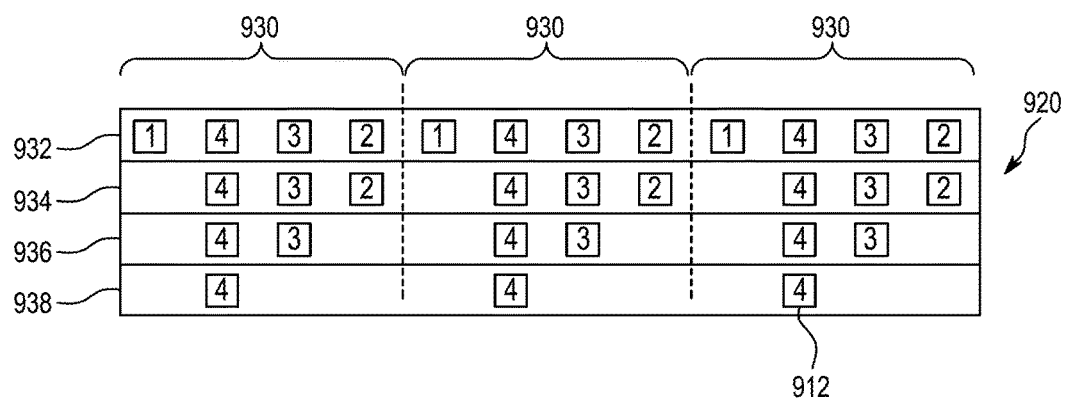
FIG. 9B is a diagram illustrating an example of an LED strip that is used in the light fixture of FIG. 9A, according to aspects of the disclosure.

FIG. 9B shows the LED strip 920 in further detail. As illustrated, the LED strip 920 may include a plurality of LEDs 912. The LEDs may be arranged in groups, herein referred to as a "Group 1", "Group 2", "Group 3", and "Group 4." The LEDs in each group may be connected in series to one another. The group to which each of the LEDs 912 belongs is denoted in FIG. 9B by the numerical identifier that is present inside the depiction of that LED 912.

The LEDs 912 may be coupled to the driver circuit 100, in accordance with the topology shown in FIG. 1A. More particularly, the LEDs 912 in each of Groups 1-4 may be connected in series to one another. Furthermore, Groups 1-4 may be connected to one another in series, as well. For example, Group 1 and Group 2 may both be coupled to a first node which is located downstream from Group 1 and upstream from Group 2. Group 2 and Group 3 may both be coupled to a second node which is located downstream from Group 2 and upstream from Group 3. Group 3 and Group 4 may both be coupled to a third node which is located downstream from Group 3 and upstream from Group 4. Group 4 may also be coupled to a fourth node that is located downstream from Group 4.

Moreover, according to the topology shown in FIG. 1A, each of the nodes may be coupled to a different one of the tap points 19A-D. More particularly, the first node may be coupled to the tap point 19A via a first electrical path. The second node may be coupled to the tap point 19B via a second electrical path. The third node may be coupled to the tap point 19C via a third electrical path. And the fourth node may be coupled to the tap point 19D via a fourth electrical path. By way of example, in some implementations, the first, second, third, and fourth electrical paths may be completely disjoint. Additionally or alternatively, in some implementations, the first, second, third, and fourth electrical paths may be parallel to one another. Stated succinctly, in some implementations, Groups 1-4 may be connected to different respective tap points of the driver circuit 100 in the same manner as groups 16A-D.

As noted above, the LEDs 912 in Group 1 may be coupled to the tap point 19A of the driver circuit 100 and may have an on-time of 80%, as a result. The LEDs 912 in Group 2 may be coupled to the tap point 19B of the driver circuit 100 and may have an on-time of 60%, as a result. The LEDs 912 in Group 3 may be coupled to the tap point 19C of the driver circuit 100 and may have an on-time of 40%, as a result. And the LEDs 912 in Group 4 may be coupled to the tap point 19D of the driver circuit 100 and may have an on-time of 20%, as a result. Consequently, the LEDs in Group 1 may have the highest brightness among the LEDs in Groups 1-4; the LEDs in Group 2 may have the second highest brightness among the LEDs in Groups 1-4; the LEDs in Group 3 may have the third highest brightness among the LEDs in Groups 1-4; and the LEDs in Group 4 may have the lowest brightness among the LEDs in Groups 1-4.

In some implementations, Groups 1-4 may include a different number of LEDs. For example, Group 1 may include 3 LEDs, Group 2 may include 6 LEDs, Group 3 may include 9 LEDs and Group 4 may include 12 LEDs. Furthermore, in some implementations, the LED strip 920 may be arranged in a plurality of sections 930. Each section may include a plurality of LEDs arranged in rows 932-938. Each if the rows 932-938 may include a different number of LEDs. Furthermore, each of the rows 932-938 may include LEDs from a different set of groups. For example, row 932 may include LEDs from Groups 1-4. Row 934 may include LEDs from Groups 2, 3, and 4 only. Row 936 may include LEDs from Groups 3 and 4 only. And row 938 may include LEDs from Group 4 only. Although in the present example, the rows 932-938 are part of the same LED strip, alternative implementations are possible in which each of rows 932-938 is part of a different LED strip. Additionally or alternatively, the rows 932-938 may each include a different number of LEDs. For instance, row 932 may include 4 LEDs row 934 may include 3 LEDs, row 936 may include 2 LEDs, and row 938 may include 1 LED.

FIGS. 1A-9B are provided as an example only. The above-described light guides are shaped as disks and/or thin cylinders. The may have two main surfaces (i.e., the bases of the cylinder) and an edge (i.e., the wall of the cylinder that extends between the bases). As used throughout the disclosure, the phrase "edge-coupled to a light guide," when used to describe the coupling between a light guide and an LED or an LED strip shall be understood to refer to any coupling which permits at least some of the light that is emitted by the LED or LED strip to enter the light guide through one or more edges of the light guide. In some implementations, but not necessarily, when an LED or LED strip is edge-coupled to a light guide, substantially all light that is emitted by the LED or LED strip may enter the light guide through its edge(s). Additionally or alternatively, in some implementations, but not necessarily, when an LED or LED strip is edge-coupled to a light guide, the LED or LED strip may be disposed adjacently to the edge(s) of the light guide such that at least one light emitting surface of the LED or the LED strip is facing the edge(s) of the light guide. Although in the light guide in each of the above-described examples has a circular shape, the present disclosure is not limited thereto. For example, any of the above-described light guides may have a rectangular shape and/or any other shape. The present disclosure is not limited to any shape and/or dimensions of the light guides disclosed herein.

Although each of the fixtures 500-900 includes a disk-shaped light guide, alternative implementations are possible in which the light guide in any of the fixtures 500-900 has another shape. For example, the light guide in any of the fixtures 500-900 may be shaped as a rectangle, a ring, a rhombus, a trapezoid, a polygon, etc. Furthermore, although in the example of FIGS. 5A-C and 8A-C the quadrants are shaped as circular sectors, alternative implementations are possible in which any of the quadrants has another shape, such as a rectangular shape, a trapezoidal shape, a rhomboid shape, a polygonal shape, etc. Furthermore, although in the example of FIGS. 5A-C and 8A-C the light guides are divided into quadrants, alternative implementations are possible in which the light guides are divided into smaller or larger portions. Those portions may be arranged in any manner, relative to one another, and/or the light guide. The present disclosure is thus not limited to any particular shape for the light guide and/or quadrants (or other portions) in any of the fixtures 500-900. Furthermore, although in the fixtures 500-900 the LEDs are coupled to the light guide from all sides (e.g., around the entire circumference of the light guide), alternative implementations are possible in which the LEDs are coupled to at least one and fewer than all sides of the light guide (e.g., coupled to only two sides of a rectangular-shaped light guide or coupled to half of the perimeter of a disk-shaped light guide).

Furthermore, although in the example of the fixtures 500-900 the LEDs are edge-coupled to the fixtures' respective light guides, alternative implementations are possible in which one or more LEDs in any of the light fixtures 500-900 are in-coupled to that fixture's light guide. When an LED is in-coupled to a light guide, that LED may be placed in a hole (e.g., a blind hole or a through hole) that is formed in the light guide. The hole may be formed in a main surface of the light guide. The main surface of the light guide may be a surface which is opposite to a surface from which light exits the light guide. Additionally or alternatively, when the LEDs in a light fixture are in-coupled to the fixture's light guide, the LEDs may be concentrated in a particular portion of the light guide or distributed uniformly across the main surface of the light guide. Furthermore, in some implementations, one or more of the LEDs in any of the light fixtures 500-900 may be situated above or below the light guide in that light fixture. Stated succinctly, the present disclosure is not limited to any type of coupling between the LEDs and light guides in the light fixtures 500-900.

Furthermore, although in the example of the light fixtures 500-900, the LEDs are mounted on a flexible board (i.e., an LED strip), alternative implementations are possible in which the LEDs are mounted on a rigid board. Additionally or alternatively, further implementations are possible in which some of the LEDs in any of the light fixtures 500-900 are coupled to a flexible board (e.g., an LED strip) while the rest is coupled to a rigid board. Additionally or alternatively, in implementations in which the LEDs are in-coupled to a light guide, the LEDs may be mounted on an in-plane rigid board together with the driver circuit 100. In such instances, the rigid board may be arranged above or below the light guide, and it may have the ability to create better thermals and light output uniformity. In some implementations, the in-plane rigid board may be parallel to any of the light guide's main surfaces.

Moreover, in the above-disclosed light fixtures are coupled directly to a driver circuit. However, alternative implementations are possible in which the light fixtures are only wired to connect to a driver circuit in accordance with the topology shown in FIG. 1A. In such instances, the LEDs in the light fixtures may be coupled to different pins of a connector or a wiring harness in a manner that permits the topology shown in FIG. 1A to be established when the connector and/or wiring harness is plugged into a driver circuit. In other words, the present disclosure is not limited to light fixtures that include a built-in driver circuit, and it is intended to encompass implementations in which the light fixtures are only wired to connect to a driver circuit that is provided separately. At least some of the elements discussed with respect to these figures can be arranged in different order, combined, and/or altogether omitted. It will be understood that the provision of the examples described herein, as well as clauses phrased as "such as," "e.g.", "including", "in some aspects," "in some implementations," and the like should not be interpreted as limiting the disclosed subject matter to the specific examples.

Having described the invention in detail, those skilled in the art will appreciate that, given the present disclosure, modifications may be made to the invention without departing from the spirit of the inventive concepts described herein. Therefore, it is not intended that the scope of the invention be limited to the specific embodiments illustrated and described.

What is being claimed is:

1. An illumination system, comprising:
   a light guide having a light emitting surface, the light emitting surface having a plurality of portions, each portion having a different light extraction pattern formed thereon, each light extraction pattern including a different plurality of light extraction features, and each light extraction pattern having a different light extraction feature density; and
   a plurality of light emitting diodes (LEDs), each LED being electrically coupled to a different respective one of the plurality of portions of the light guide, such that a length of a period for which the LED is powered on during a cycle of a waveform is inversely proportional to the light extraction feature density of the respective portion's light extraction pattern.

2. The illumination system of claim 1, wherein the light guide is shaped as a disk and each of the plurality of portions corresponds to a different circular sector of the disk.

3. The illumination system of claim 1, wherein the light extraction patterns are configured to even out differences in brightness between the LEDs.

4. The illumination system of claim 1, wherein the LEDs are part of a flexible LED strip that is wrapped around at least a portion of a circumference of the light guide.

5. The illumination system of claim 1, wherein each of the light extraction features includes a printed light extraction feature.

6. The illumination system of claim 1, wherein each of the light extraction features includes a molded light extraction feature.

7. The illumination system of claim 1, wherein the light guide includes a slate of light-transmissive material, and each LED is disposed adjacently to the slate such that light emitted from the LED is injected into the slate through at least one edge of the slate.

8. An illumination system, comprising:
   a light guide;
   a driver circuit including a plurality of tap points, the driver circuit being configured to produce a cyclical waveform and switch the tap points on and off in sequence during each cycle of the waveform; and
   a plurality of first light emitting diode (LED) groups that are coupled to the light guide and have a same average on-time, each of the first LED groups including a respective first LED and a respective second LED that are disposed adjacently to one another and coupled to different tap points of the driver circuit, the first LED in any given first LED group being coupled in series with one or more other first LEDs that are part of other first LED groups, and the second LED in any given first LED group being coupled in series with one or more other second LEDs that are part of other first LED groups.

9. The illumination system of claim 8, wherein the LEDs in each first LED group are part of different flexible LED strips.

10. The illumination system of claim 8, wherein the LEDs in each first LED group are part of a same flexible LED strip.

11. The illumination system of claim 8, wherein the light guide is shaped as a disk having two surfaces and an edge, and the first LED groups are distributed around a circumference of the light guide, such that light emitted from each first LED group is injected into the light guide through the edge to exit the light guide through at least one of the surfaces.

12. The illumination system of claim 8, further comprising: a plurality of second LED groups that are coupled to the light guide and have a same average on-time as the first LED groups, each of the LED groups including a respective third LED and a respective fourth LED that are disposed adjacently to one another and coupled to different tap points of the driver circuit, the third LED in any given second LED group being coupled in series with one or more other third LEDs that are part of other second LED groups, and the fourth LED in any given second LED group being coupled in series with one or more other fourth LEDs that are part of other fourth LED groups.

13. The illumination system of claim 12, wherein the first LEDs are coupled to a first tap point of the driver circuit, the second LEDs are coupled to a second tap point of the driver circuit, the third LEDs are coupled to a third tap point of the driver circuit, and the fourth LEDs are coupled to a fourth tap point of the driver circuit.

14. The illumination system of claim 12, wherein each first LED group is disposed adjacently to a different second LED group.

15. An illumination system, comprising:
   a light guide having a plurality of portions;
   a driver circuit including a plurality of tap points, the driver circuit being configured to produce a cyclical waveform and switch the tap points on and off in sequence during each cycle of the waveform;
   a plurality of first LEDs coupled in series, each first LED being coupled to a different tap point of the light guide, and each first LED being coupled to a different portion of the light guide, such that each portion of the light guide is coupled to a different respective first LED;

a plurality of second LEDs coupled in series, each second LED being coupled to a different tap point of the light guide, and each second LED being coupled to a different portion of the light guide, such that each portion of the light guide is also coupled to a different respective second LED, and an average on-time of all LEDs that are coupled to any given portion of the light guide is substantially the same.

16. The illumination system of claim 15, wherein the light guide is shaped as a disk, each of the plurality of portions corresponds to a different circular sector of the disk, and the first LEDs and the second LED are coupled to an outer edge of the disk.

17. The illumination system of claim 15, wherein the light guide includes a slate of light-transmissive material, and each first and second LED is disposed adjacently to the slate such that light emitted from that LED is injected into the slate through an edge of the slate.

18. The illumination system of claim 15, wherein average on-time of all LEDs that are coupled to any given portion of the light guide is equal to a sum of respective individual on-times of all LEDs that are coupled to the given portion of the light guide divided by a count of the LEDs that are coupled to the given portion of the light guide.

19. The illumination system of claim 18, wherein the first plurality of LEDs and the second plurality of LEDs are part of a same flexible LED strip.

20. The illumination system of claim 15, wherein the first plurality of LEDs and the second plurality of LEDs are part of different flexible LED strip.

* * * * *